3 Sheets--Sheet 1.

HIRAM PLUMMER.

Sewing Machine.

No. 4,840. Reissued April 2, 1872.

Witnesses

Chas. H. Smith

Harold Serrell

Hiram Plummer

Lemuel W. Serrell

3 Sheets--Sheet 2

HIRAM PLUMMER.
Sewing Machine.
No. 4,840.

Reissued April 2, 1872.

Witnesses
Chas H Smith
Harold Serrell

Hiram Plummer
Lemuel W. Serrell
Atty.

3 Sheets--Sheet 3.

HIRAM PLUMMER.

Sewing Machine.

No. 4,840. Reissued April 2, 1872.

Witnesses:
Geo. H. Lord
Samuel W. Sewell

Hiram Plummer
Samuel W. Sewell
Atty

UNITED STATES PATENT OFFICE.

HIRAM PLUMMER, OF BROOKLYN, NEW YORK.

IMPROVEMENT IN SEWING-MACHINES.

Specification forming part of Letters Patent No. 79,856, dated July 14, 1868; reissue No. 4,840, dated April 2, 1872.

*To all whom it may concern:*

Be it known that I, HIRAM PLUMMER, of Brooklyn, in the county of Kings and State of New York, have invented, made, and applied to use a certain new and useful Improvement in Sewing-Machines; and I do hereby declare the following to be a full, clear, and exact description of said invention.

This sewing-machine is especially adapted to the sewing of straw and other braids for bonnets and hats. It is also capable of use in sewing sails, making bags, and performing other kinds of work, such as the seams of garments and sewing generally.

In my machine the needle reciprocates beneath the bed, and the fabric is presented to the same in a crimped or folded form, so that the needle comes out upon the same side of the fabric as that on which it entered, and the parts are adapted to guiding the fabric and presenting the same to the sewing mechanism.

The stitch that is produced consists of two threads passing through the fabric diagonally, so as to show a short stitch on the right side of the material, and the thread on the other side from the point where the needle enters the goods is looped to the next point of perforation, and either interlocks with a second or shuttle-thread or with the loop of needle-thread. The character of the stitch will be understood from the foregoing and a reference to Fig. 4, in which the shuttle-thread is shown by a dotted line, and the needle-thread in full lines.

Figure 5:
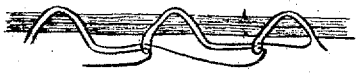

If a looping-instrument were employed in this machine instead of a shuttle, the single thread would be concatenated in the form shown in Fig. 5; the stitch, however, might be difficult to tighten.

Figure 3:
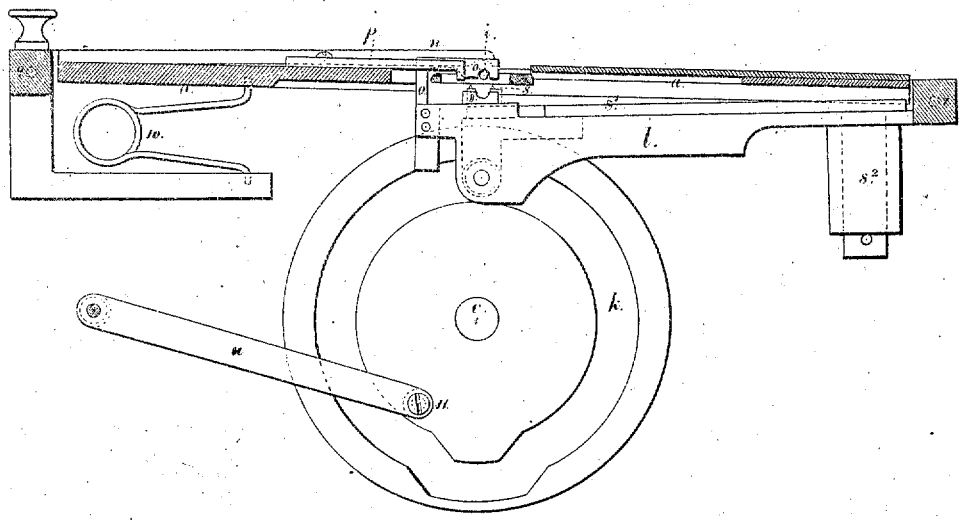
Figure 2:
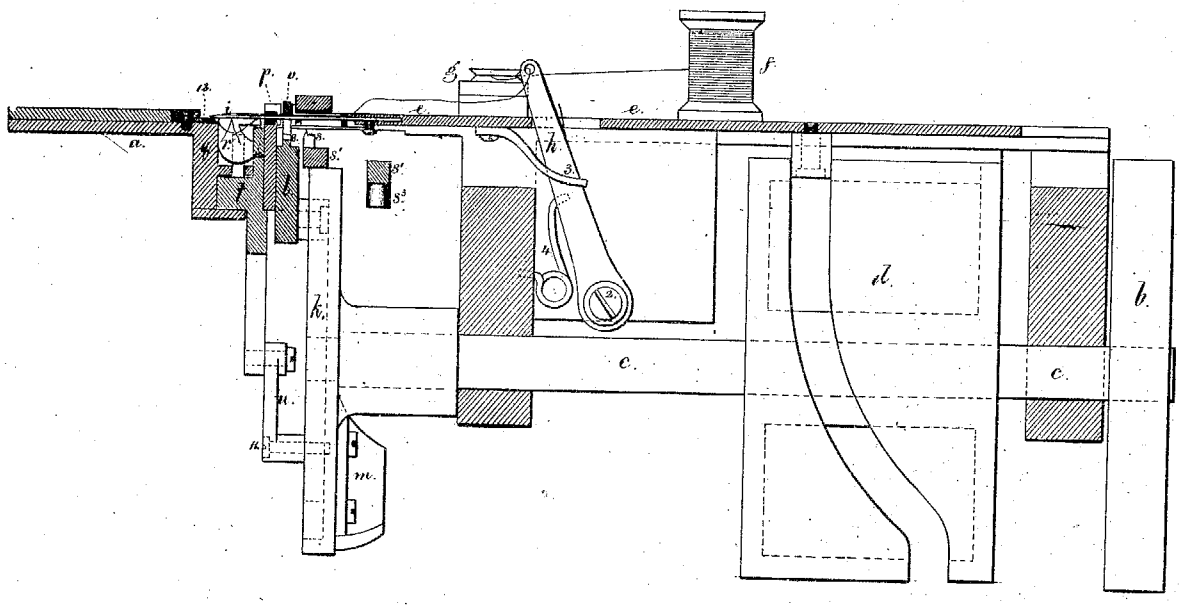
Figure 1:
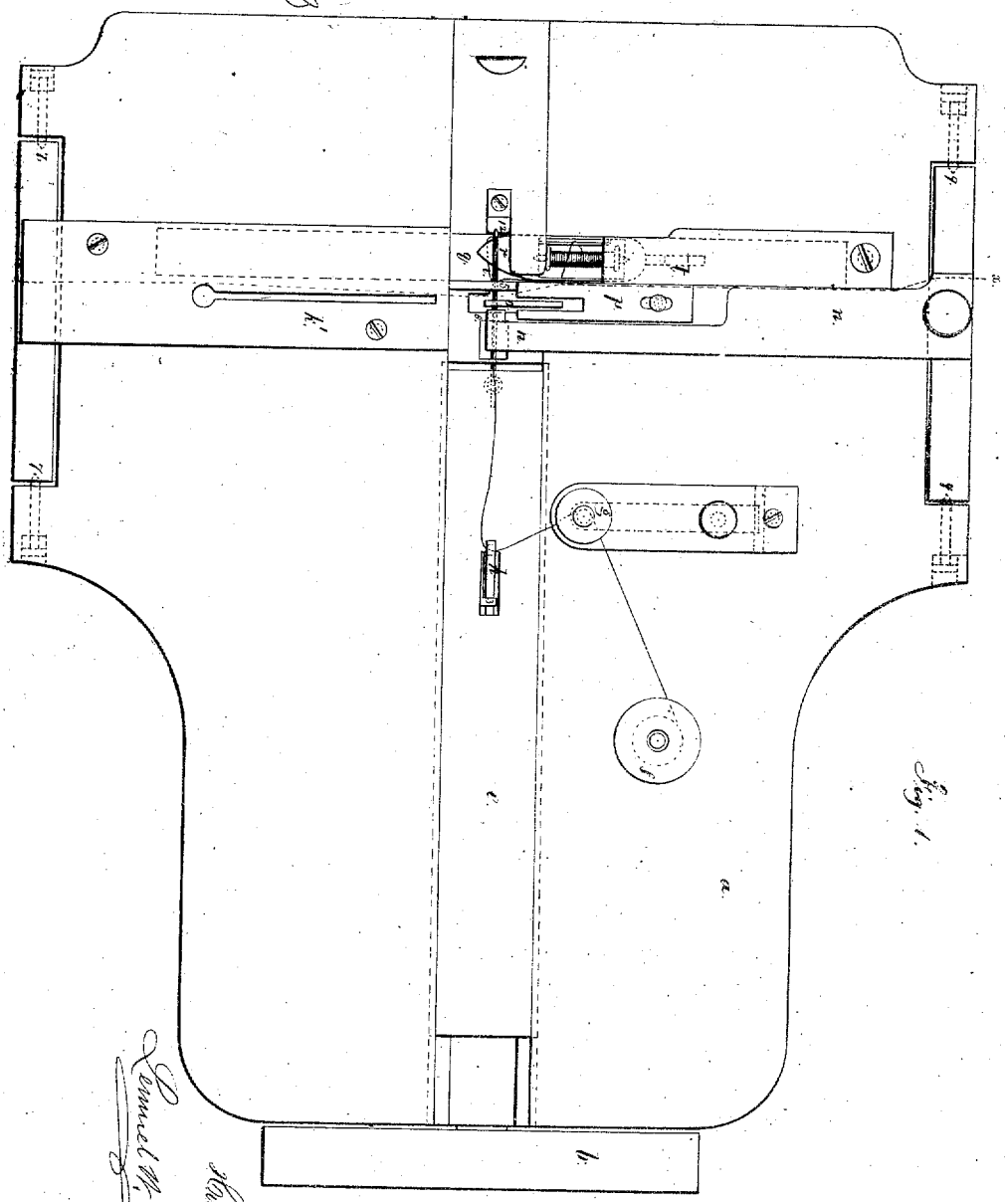

In the drawing, Figure 1 is a plan of said sewing-machine. Fig. 2 is a side view with the parts of the frame and bed in section. Fig. 3 is a section at the line *x x* of Fig. 1.

*a* is the bed of the machine. *b* the actuating wheel, giving motion to the shaft *c*, upon which is a cam, *d*, that reciprocates the needle-bar *e* and needle *i* by sliding said needle-bar *e* in ways provided for it in the bed *a*. The thread from the spool *f* passes to a proper tension device *g* of any suitable character; thence through the take-up arm *h* to the needle. This take-up arm *h* is on a fulcrum, 2, and a retracting finger, 3, on the under side of the needle-bar *e*, acting nearer the fulcrum 2 than does the slot in the needle-bar, causes the upper end of the take-up arm to travel sufficiently to give the proper amount of thread to allow the shuttle to pass through the loop; and the finger 3 also releases said take-up arm with sufficient rapidity on the return movement of the needle-bar to allow the spring 4 to act on the take-up arm *h* and draw the thread up out of the way of the needle in going forward again.

In this machine the stitch usually is of much greater length than in ordinary sewing-machines, because it is found in sewing braids for bonnets, &c., that the stitches should be some little distance apart, and for this reason a greater length of thread is drawn off to form a stitch than in ordinary sewing; and, in consequence of the thread passing off nearly at right angles to the needle in reaching the goods, the pull of such thread as the needle starts might bend the needle. I therefore form the slot in the needle-bar *e*, so that as the needle draws back out of the cloth the upper end of the take-up arm *h* will draw on the thread and pull an extra length off the spool to give sufficient slack thread for the needle to go freely forward into the fold of goods to form the next stitch. The fold of the goods through which the needle passes is made by the folder *o*, that is moved up and down between the supports 5 and 6 of the bed, and said folder together with the supports 5 and 6 has holes or notches to allow of the passage of the needle. The supports 5 and 6 should be adjustable to allow for varying thicknesses of goods.

Figure 6:
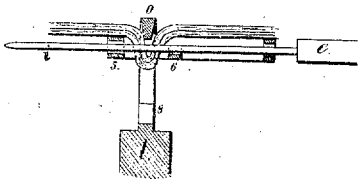

In Fig. 6 the folder *o* and supports 5 and 6 are represented in larger size. The folder *o* is attached to a swinging plate, *l*, that has the screws 7 7 for its fulcrum, and is moved up and down at the proper time by the grooved face cam *k* on the end of the shaft *c*, and the folder *o* is to be attached adjustably to said plate *l*, so that the amount of depression or fold given to the fabric may be regulated by raising or lowering said folder *o*. Upon the plate *l* is a rib, 8, that lifts the fabric out from between the supports 5 and 6 as the plate *l* is raised. The act of raising the plate *l* also operates the perforating feed $s$ upon an arm, $s^1$, that is pivoted upon the plate $l$ at $s^2$, and moves up and down with it; but can have a horizontal movement given to it by a cam, $m$, upon the back of the cam $k$, which acts upon a stud or roller, $s^3$, upon the under side of the arm $s^1$, and this cam $m$ acting when the plate $l$, arm $s^1$, and point $s$ are raised causes the material to be fed along.

Figure 7:
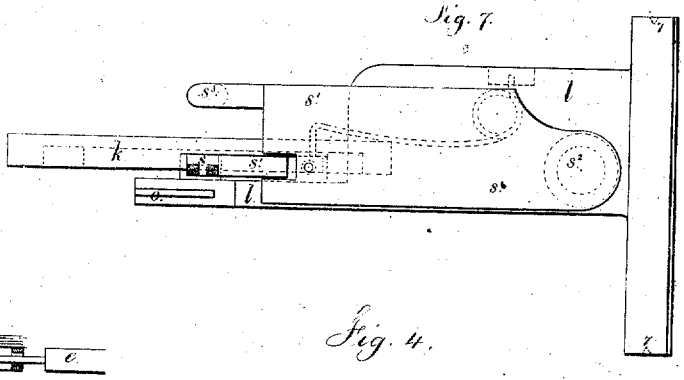

Fig. 7 represents the plate $l$ and parts connected to the same, as detached from the machine.

I make use of the pressure-foot $n$, swinging upon the pivots 9, and acted upon by the spring 10 to keep the fabric down upon the feed, and this pressure-foot may be straight, as shown, or curved upward to be clear of the bed A. An adjustable gauge, $p$, is provided for the edge of the braid or strip of material being sewed, and this gauge may be forked to set at both sides of the folder $o$, and may also be double to act as a gauge to the edge of the material to which the braid is being sewed. The race-way $q$ for the shuttle $r$ is of any usual character. It runs across the bed $a$ at right angles to the needle-bar, and the shuttle-driver $t$ that is actuated by the link $u$ and crank-pin 11 is of a shape to act upon the shuttle, that is placed in the said race-way with its flat side upward, to act below the needle and take a loop of needle-thread as said shuttle crosses below said needle, when the latter pauses in consequence of the shape of the cam $d$. The end of the needle $i$ is received upon an incline at 12, so as to be steadied and kept up out of the way of the shuttle should said needle become bent, or the end of the needle may pass into a tapering hole.

If desired the supports 5 and 6 might be raised up, and the folder remain stationary if the other parts were arranged to act in harmony therewith.

It will be evident that the body of the material that is being sewed lies upon the bed $a$, with the edge thereof extending slightly beyond and nearly in line with the needle, and stopped against a gauge, if desired, as aforesaid.

Figure 4:
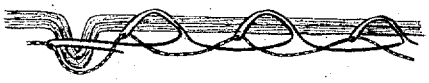

The braid or strip of material that is to be sewed is supplied, so as to pass beneath the edge of the previously-sewed material, the positions of the parts being determined by gauges, and both thicknesses pass beneath the folder $o$, so that the needle will pass through the two thicknesses, as illustrated in Figs. 4 and 6, while held down by the folder $o$, and as the needle draws back a loop of needle-thread remains in the hole, in consequence of the shuttle with its thread having previously passed through the loop of needle-thread. The raising of the folder $o$ relieves the material, it is moved along, and then the folder $o$ again crimps the material into the form for the needle to pass through it again.

Braids can be sewn in a circular form by commencing in the center and employing a pin as a guide around which the material revolves as it is sewed, and this pin can enter and slide in a slot, as shown at $k'$, Fig. 1, as the circle increases in size.

In this sewing-machine the stitch does not pass through the fabric at right angles, but diagonally, the points where the needle enters and emerges being further apart on the under side of the material than they are on the upper surface contiguous to the folder $o$, as seen in Figs. 4 and 6; hence this stitch is especially adapted to sewing straw goods, because the stitch shows but little upon the upper or right side of the goods, and the stitch is very strong and elastic.

The sewing mechanism acting beneath the supporting surface the braid to be sewed laps below the edge of the previously-sewed portion, and hence in sewing the circular braid or coil before mentioned, the goods will be right side up upon the bed, and the center of the coil can be guided by a pin in the slot $k'$.

I claim as my invention—

1. The combination of a reciprocating perforating needle with the folder $o$, constructed and operating substantially as described, and shuttle $r$, or its equivalent, for the purposes and as set forth.

2. A feeding mechanism acting in the direction of the needle's length, in combination with a flat bed supporting the material, a reciprocating folder, acting to depress the material below the bed, and a reciprocating perforating needle, substantially as specified.

3. A perforating needle reciprocated beneath and in a plane parallel or nearly so to the flat bed on which the fabric is placed, in combination with the shuttle moved transversely to the needle and beneath the bed, and the mechanism that draws a crimp of the fabric down into the bed for the needle to pass through the same, substantially as set forth.

4. The swinging plate $l$, carrying the folder $o$, in combination with the feeding point $s$ and mechanism, substantially as specified, for giving motion to the parts.

5. A guide or gauge, substantially as described, for presenting the braid to be sewed between the edge of the previously-sewed braid and the bed, in combination with sewing mechanism, substantially as specified, acting below the bed or supporting surface, for sewing braid with a short stitch upon the surface, and the principal portion of the thread on the under side, as set forth.

Signed by me this 25th day of July, A. D. 1871.

HIRAM PLUMMER.

Witnesses:
CHAS. H. SMITH,
HAROLD SERRELL.